(12) United States Patent
Clark et al.

(10) Patent No.: US 7,718,015 B2
(45) Date of Patent: *May 18, 2010

(54) METHOD AND APPARATUS FOR HEAT-TREATING AN ARTICLE AND A FIXTURE FOR USE IN THE SAME

(75) Inventors: Daniel Clark, Derby (GB); Barry D Smith, Hathern (GB)

(73) Assignee: Rolls-Royce plc, London (GB)

( * ) Notice: Subject to any disclaimer, the term of this patent is extended or adjusted under 35 U.S.C. 154(b) by 196 days.

This patent is subject to a terminal disclaimer.

(21) Appl. No.: 11/905,695

(22) Filed: Oct. 3, 2007

(65) Prior Publication Data

US 2008/0029927 A1 Feb. 7, 2008

Related U.S. Application Data

(63) Continuation of application No. 11/010,479, filed on Dec. 14, 2004, now Pat. No. 7,344,608.

(30) Foreign Application Priority Data

Dec. 17, 2003 (GB) .................................. 0329268.7

(51) Int. Cl.
*B29C 71/02* (2006.01)
(52) U.S. Cl. .................. 148/522; 148/537; 264/346
(58) Field of Classification Search ...................... None
See application file for complete search history.

(56) References Cited

U.S. PATENT DOCUMENTS

| 2,907,084 | A | * | 10/1959 | Wood | 164/30 |
|---|---|---|---|---|---|
| 2,993,980 | A | | 7/1961 | Dunn | |
| 4,578,303 | A | * | 3/1986 | Kundinger et al. | 428/116 |
| 5,114,501 | A | | 5/1992 | Ames | |
| 5,711,826 | A | | 1/1998 | Nordstrom | |
| 6,274,839 | B1 | | 8/2001 | Stone | |
| 6,506,048 | B1 | | 1/2003 | Staffin | |
| 6,672,367 | B2 | | 1/2004 | Crafton | |
| 7,344,608 | B2 | * | 3/2008 | Clark et al. | 148/522 |

FOREIGN PATENT DOCUMENTS

| EP | 441042 A3 | 8/1991 |
|---|---|---|
| GB | 709632 SP | 6/1954 |
| GB | 856765 SP | 12/1960 |
| GB | 931259 SP | 7/1963 |
| JP | 62174327 AB | 7/1987 |

* cited by examiner

*Primary Examiner*—George Wyszomierski
(74) *Attorney, Agent, or Firm*—Jeffrey S. Melcher; Manelli Denison & Selter PLLC

(57) ABSTRACT

A substrate (33) is clamped into a fixture (32) and material is deposited thereon to form a complex article (40). The article (40) produced is packed, using ceramic inserts (42) and a coating (41). The packing (42) ensures that the article (40) maintains its true shape and allows for expansion during the subsequent heat treatment process. The packed article (40), mounted on the fixture (32), is then placed in a box (44), encased in a granular material (43) and heated. It is heated to a temperature sufficient to relieve stresses and is maintained at this temperature for a time period such that the stresses in the article (40) are relieved.

16 Claims, 3 Drawing Sheets

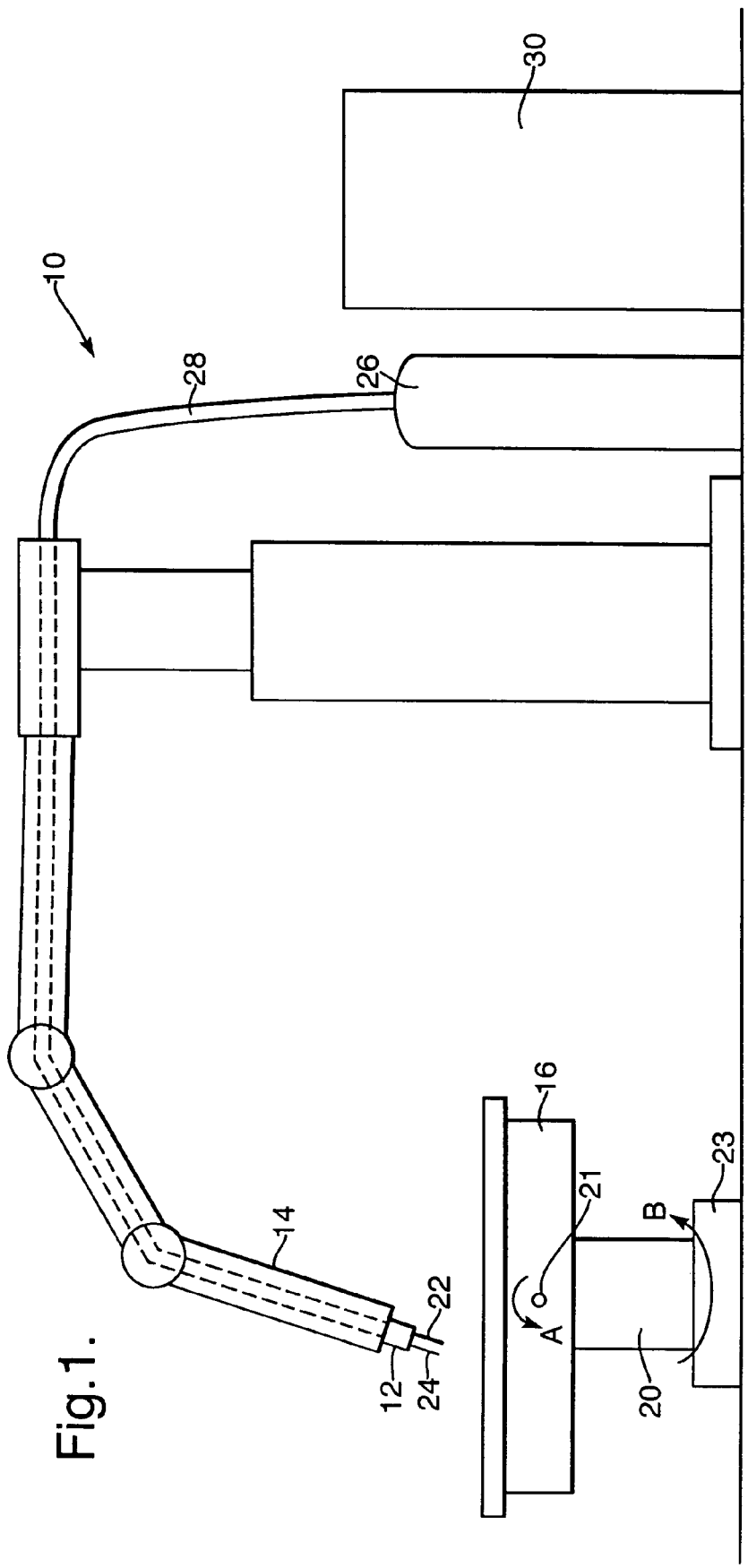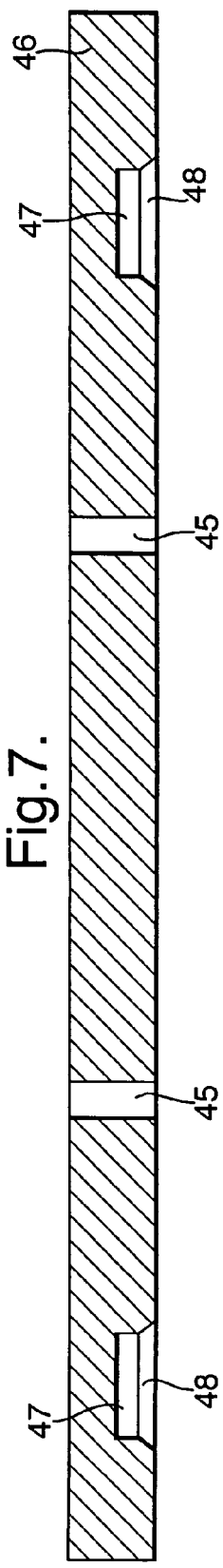

METHOD AND APPARATUS FOR HEAT-TREATING AN ARTICLE AND A FIXTURE FOR USE IN THE SAME

This Application is a Continuation of application Ser. No. 11/010,479, filed Dec. 14, 2004, now U.S. Pat. No. 7,344,608.

The present invention relates to a method and apparatus for heat-treating an article and in particular complex articles manufactured from layers of deposited material. A fixture is also disclosed for holding the complex article during its manufacture and the subsequent heat-treatment.

It is known to produce metal work pieces by the deposition of a weld material onto a base plate. The weld material can be deposited by any one of a number of techniques including laser welding, electron beam welding, metal inert gas welding (MIG) or tungsten inert gas welding (TIG). In MIG or TIG welding a welding torch is provided adjacent a base plate on which the work piece is to be produced. An electrode is provided within the weld torch such that when an electric current is passed therethrough an arc is formed between the weld torch electrode and the base plate. The arc generates heat allowing the welding to take place.

In the MIG process the electrode melts and forms a weld pool in the surface of the work piece. However in TIG welding the arc melts the material of the base plate and a consumable welding wire is fed into the weld pool to form the work piece.

The MIG and TIG welding processes have been used for building up features on conventionally manufactured components. However drawbacks have been encountered in producing such hybrid structures. For example the substrate on which the weld material is deposited must be elevated in temperature to prevent excessive or uneven heat-flow, to help establish process uniformity. This is currently achieved by either heating the substrate with the arc prior to depositing any material or by external heating. Also during the metal deposition process residual forces are generated which have to be relieved by heat treatment.

During the heat treatment process the deposited features are clamped in a fixture to ensure they keep their true shape. However if the deposited feature is manufactured from titanium then the temperature at which it is heat-treated is above the limits for softening the fixture. Using existing fixtures through a thermal cycle for heat-treating titanium severely limits the life of the fixture and the fixtures become expensive consumables.

The present invention seeks to provide an improved heat-treatment process and apparatus, which overcome the aforementioned problems.

According to one aspect of the present invention a first method of heat treating an article comprises the steps of forming an article to be heat treated, packing the article to retain its shape and wrapping the packed article it in a layer of material, encasing the wrapped article in a granular material and binding the granular material together to form a mould, removing the wrapped article from the mould to unwrap it and replacing the unwrapped article in the mould, heating the article and the mould to a temperature which is sufficient to relieve stresses in the article and maintaining the encased article at this temperature for a time period such that the stresses in the article are relieved.

A second method of heat treating an article comprises the steps of forming an article to be heat treated, packing the formed article to retain its shape, applying a coating onto the packed article, encasing the coated article in a granular material and binding the granular material together to form a mould, heating the encased article to a first temperature which is sufficient to remove the coating and then subsequently heating to a second temperature which is sufficient to relieve stresses in the formed article, maintaining the encased article at the second temperature for a time period such that the stresses in the article are relieved.

A coating of polyurethane or polystyrene may be sprayed onto the article as foam. Alternatively the article is wrapped in a ceramic cloth.

Preferably the article is formed by material deposition and the material is deposited in layers using a welding process.

Ceramic cores may be used to pack the article.

The granular material is sand and it can be reinforced with glass particles. The granular material is bound together by an inert binder such as gypsum.

According to a further aspect of the present invention a fixture for holding a substrate onto which an article is to be formed comprises a member having means for locating and holding the substrate on a face thereof, at least one recess being provided in said face.

The recess may be circular and in the preferred embodiment a plurality of circular recesses are provided which are interconnected.

The means for locating the substrate is at least one block mounted on the face. A plurality of blocks may be provided some of which translate relative to the face to hold the substrate thereon. Alternatively the means for holding the substrate are clamps.

The present invention will now be described with reference to the accompanying figures in which;

FIG. 1 is a schematic view of apparatus for forming a work piece by material deposition.

FIG. 7 is a cross-sectional view of a lid for the apparatus shown in FIG. 6.

Figure 2:
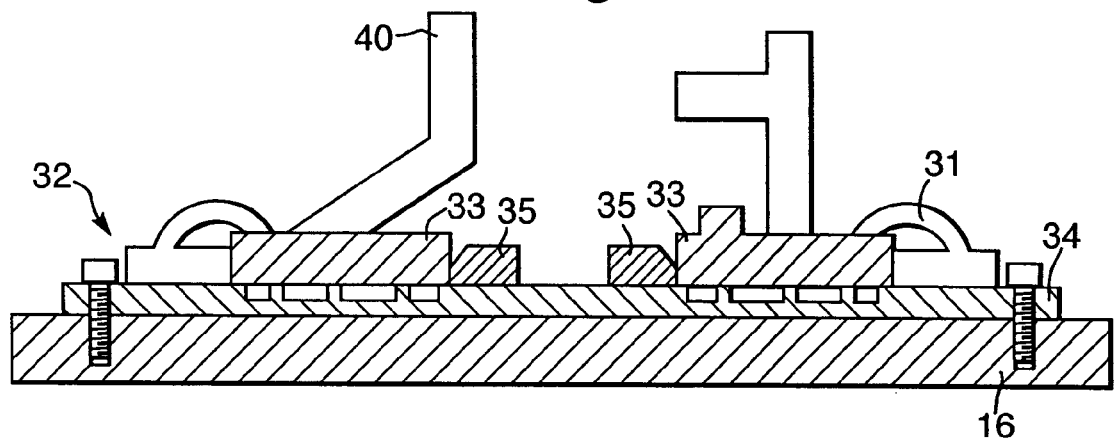
FIG. 2 is a cross-sectional view of a fixture for attachment to the apparatus shown in FIG. 1.

Referring to FIG. 1 apparatus (10) for forming an article (40) comprises a welding torch (12) attached to a computer controlled robot arm (14). A table (16) is mounted on a pedestal (20), which rotates about base (23), as indicated by arrow B. The table (16) is also capable of pivotal movement in the direction of arrow A around shaft (21) to maintain an angle of 90° between the torch (12) and the table (16).

A number of metal wires (22, 24) extend through the robot arm (14) from a supply in the form of a reel (not shown). The wires (22, 24) are fed from the reel to the welding torch (12) such that the ends of the wires (22, 24) extend just below the tip of the welding torch (12). The wires (22, 24) are manufactured from a suitable welding material such as titanium.

The apparatus also includes a supply of an inert gas, for example argon. The gas is supplied by a gas pipe (28), which extends through the robot arm (14) from a cylinder (26) to the welding torch (12).

A computer (30) controls the movement of the table (16) and the robot arm (14) as well as controlling the supply of argon and feeding the metal wires (22 and 24).

In operation the table (16) and the welding torch (12) are both connected to a supply of electricity. Argon gas is fed via the pipe (28) to form an argon shroud around the welding torch (12). The argon gas between the wire electrodes (22,24)

is ionised to create an electrical arc. The wires (22, 24) are consumable as they act as both the arc initiator and also as the welding material.

Figure 4:
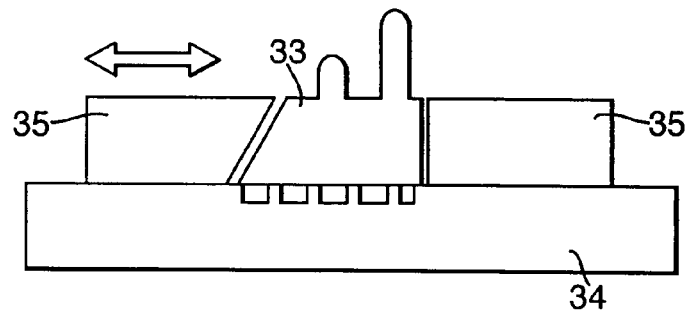
FIG. 4 is a cross-sectional view of an alternative fixture.

A fixture (32), FIG. 2, is bolted onto the rotary table (16). The fixture (32) has a base plate (34) onto which a substrate (33) is fastened. The substrate (33) is located against blocks (35) mounted on the upper surface of the base plate (34). Some of the blocks (35) may translate relative to the base plate (34) to fasten the substrate (33) in position, FIG. 4. Alternatively clamps (31), shown in FIG. 2, are used to fasten the substrate in position.

Figure 3:
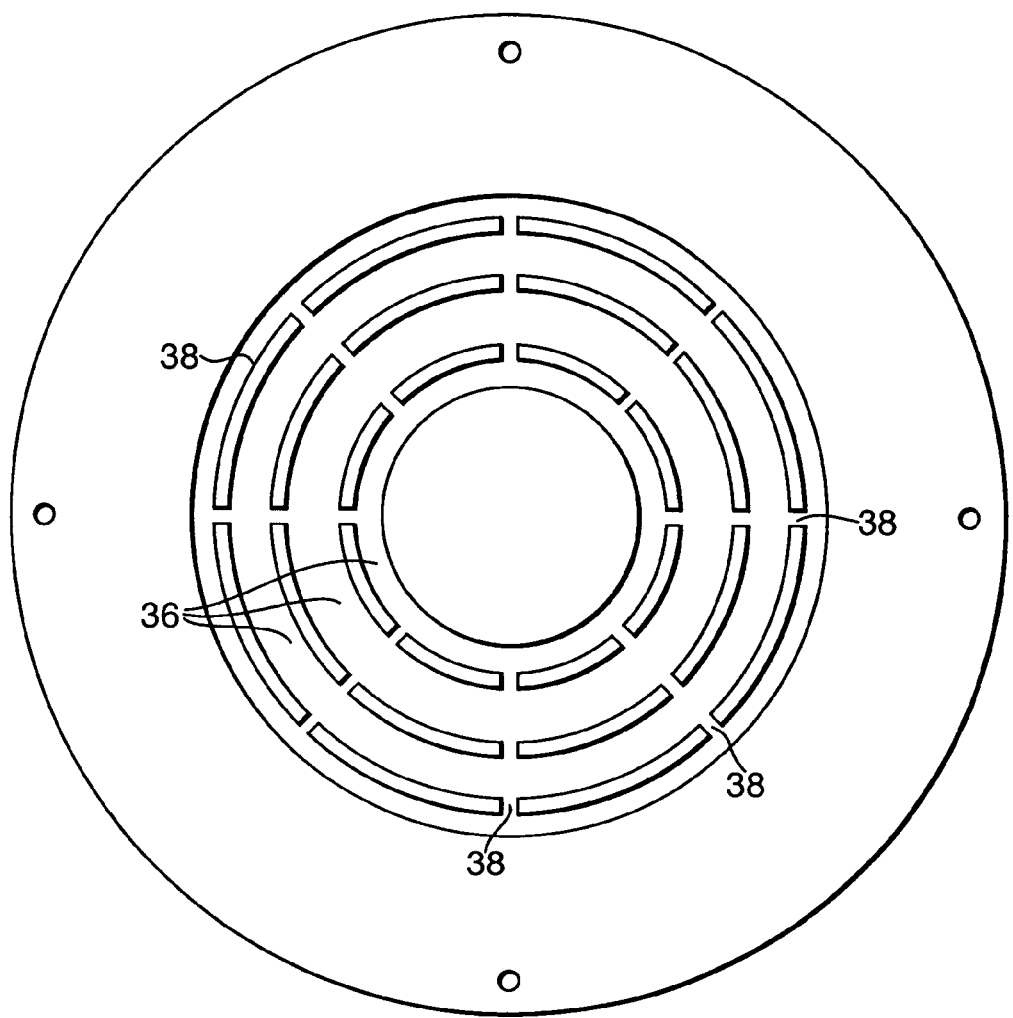
FIG. 3 is a plan view of the base plate of the fixture shown in FIG. 2.

The upper surface of the base plate (34), on which the substrate is fastened, is also provided with a series of grooves (36). In the embodiment shown in FIG. 3 the grooves (36) are in the form of concentric circles, which are interconnected at various radial positions (38). The grooves (36) allow argon gas, supplied during the welding process, to circulate freely beneath the substrate (33). The circulation of the argon gas within the grooves (36) prevents stagnant air-rich pockets forming beneath the substrate (33).

The base plate (34) and the substrate (33) are preheated prior to weld material being deposited. For process uniformity the base plate (34) and the substrate (33) are maintained at a temperature, which ensure steady heat-flow conditions. The base plate (34) of the fixture (32) is manufactured from a material, which can be easily maintained at the temperature of the substrate (33).

In the preferred embodiment of the present invention where titanium is being deposited onto a wrought, cast or previously deposited substrate of titanium, the base plate (34) is manufactured from either a heat resistant iron-nickel-chromium alloy or a super alloy.

The wire electrodes (22 and 24), in the welding head (12), deposit titanium onto the substrate (33) to form a complex article (40). High residual stresses are induced in the article (40) as it is deposited onto the substrate (33). These residual stresses are relieved in a subsequent heat treatment process.

Figure 5:
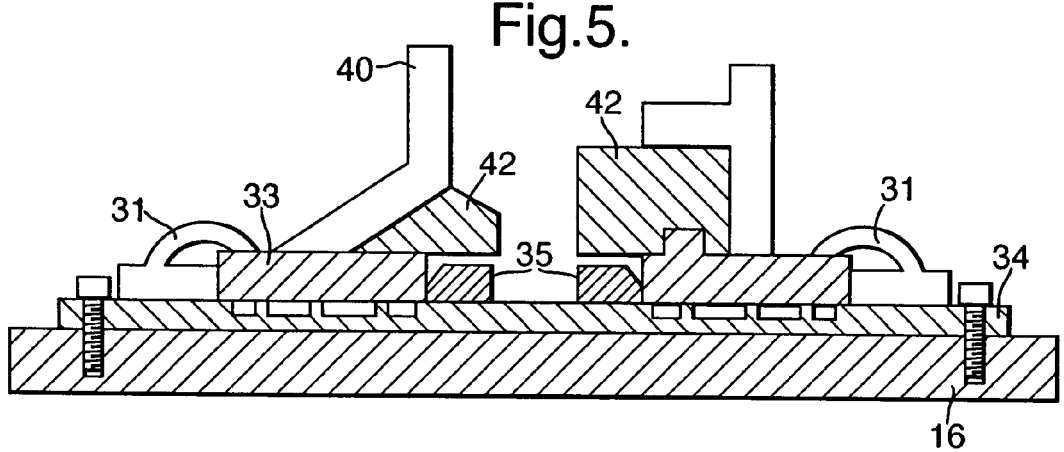
FIG. 5 is a cross-sectional view showing the use of ceramic supports to pack an article mounted on the fixture shown in FIG. 2.

However before the article (40) is heat-treated it is first packed using ceramic support cores (42), FIG. 5. The support cores (42) maintain the true shape of the article (40) during the heat treatment process.

To allow for thermal expansion during the heat treatment process the deposited article (40) can be either coated with foam or wrapped in fabric. The foam may be polyurethane or polystyrene and is sprayed onto the article. Alternatively a ceramic cloth, ceramic wool or other lint free material is wrapped around the article (40).

Figure 6:
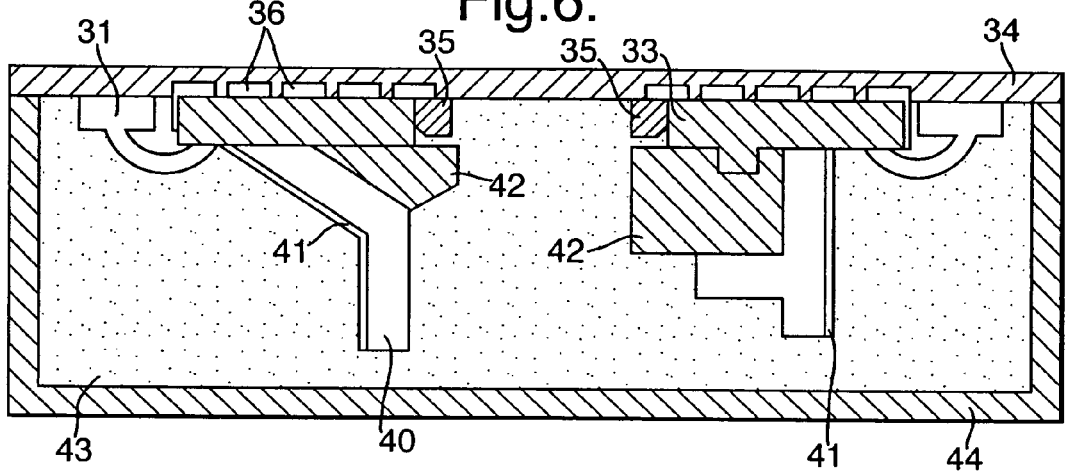
FIG. 6 is a cross-sectional view of apparatus for heat-treating an article.

The article (40), attached to the fixture (32), is then placed into a box (44), FIG. 6. The box (44) is manufactured from mild steel reinforced with a super alloy. It will however be appreciated that the box (44) could be made from different materials provided that it is self-supporting at the temperatures required in the subsequent heat treatment process.

The box (44) is filled with a granular material (43). In the preferred embodiment of the present invention the granular material (43) is casting sand. The sand (43) may be reinforced with either metal or glass spheres. In the preferred embodiment of the present invention the sand (43) is reinforced with glass. The glass forms a vitreous support layer when heated.

An inert binder is added to the reinforced sand (43) to bind it together to form a cast around the article (40). In the preferred embodiment of the present invention the binder is a gypsum compound, which can withstand exposure to the hot metal temperatures, which are of the order of 780° C. It will however be appreciated by one skilled in the art that any type of binder may be used provided that it can withstand the high temperatures used in the subsequent heat treatment process.

If the article (40) has been sprayed with foam this is removed after the sand (43) has been bound together. The foam is removed by baking in a furnace, having a gas extraction system, at a temperature of the order of 300° C. The foam vaporizes to leave a recess (41) between the article (40) and the sand (43). The recess (41) is provided to allow for the thermal expansion of the article (40) during the subsequent heat treatment process.

If the article (40) has been wound in a fabric this can be removed by baking as described above or alternatively it can be removed manually.

Once the foam or fabric has been removed a lid (46), FIG. 7, is then placed into the box (44). The lid (46) is a circular plate on which stiffening ribs are welded so that it is self-supporting at high temperatures. Holes (45) are provided in the lid (46), which enable it to be lifted but which also prevent gas entrapment during the heat treatment process. The lid (46) includes a recess (47) that locates on the article (40). The edges of the recess (47) in the lid (46) are chamfered (48) to allow for easy location and removal. The weight of the lid (46) applies an even pressure on the sand (43), preventing the sand (43) from moving as the article (40) expands during the heat treatment process.

The box (44) and its contents are then heated to an elevated temperature for a predetermined length of time. A titanium deposit would be maintained at a temperature in the range of 500-970° C. for a period of approximately two hours.

On completion of the heat treatment the article (40) is removed from the box (44) and is unclamped from the fixture (32). The heat treatment process acts to relieve stresses induced in the article (40) during its manufacture so that it does not distort when it is unclamped from the fixture (32).

We claim:

1. A method of heat treating an article comprising the steps of forming an article to be heat treated, packing the formed article to retain its shape, applying a coating onto the packed article, encasing the coated article in a granular material and binding the granular material together to form a mould, heating the encased article to a first temperature which is sufficient to remove the coating by melting said coating and then subsequently heating to a second temperature which is sufficient to relieve stresses in the formed article, maintaining the encased article at the second temperature for a time period such that the stresses in the article are relieved.

2. A method as claimed in claim 1 in which ceramic cores are used to pack the article.

3. A method as claimed in claim 1 in which the granular material is sand.

4. A method as claimed in claim 1 in which the granular material is reinforced with glass particles.

5. A method as claimed in claim 1 in which the granular material is bound together by an inert binder.

6. A method as claimed in claim 5 in which the binder is gypsum.

7. A method of heat treating an article comprising the steps of:
    forming an article to be heat treated;
    packing the formed article to form a packed article and retain a shape of the article;
    applying a coating onto the packed article to form a coated article;
    encasing the coated article in a granular material and binding the granular material together to form an encased article;
    heating the encased article to a first temperature which is sufficient to remove the coating by vaporizing the coating to form a recess between the article and the granular material and then subsequently heating the article to a second temperature which is sufficient to relieve stresses in the formed article; and maintaining the encased article at the second temperature for a time period such that the stresses in the article are relieved.

8. The method according to claim 7, wherein the step of applying a coating comprises spraying a foam coating on the packed article.

9. The method according to claim 7, wherein ceramic cores are used to pack the article.

10. The method according to claim 7, wherein the granular material comprises sand.

11. The method according to claim 7, wherein the granular material is reinforced with glass particles.

12. The method according to claim 7, wherein the granular material is bound together by an inert binder.

13. The method according to claim 12, wherein the binder is gypsum.

14. The method according to claim 7, wherein the coating comprises a polyurethane foam.

15. The method according to claim 7, wherein the coating comprises a polystyrene foam.

16. The method according to claim 7, further comprising attaching the article to a fixture, placing the article attached to the fixture in a box, and filling the box with the granular material to encase the article.

* * * * *